(12) United States Patent
Ferlitsch

(10) Patent No.: US 7,983,420 B2
(45) Date of Patent: Jul. 19, 2011

(54) IMAGING JOB AUTHORIZATION

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 2367 days.

(21) Appl. No.: 10/852,554

(22) Filed: May 24, 2004

(65) Prior Publication Data
US 2005/0273852 A1 Dec. 8, 2005

(51) Int. Cl.
*H04K 1/00* (2006.01)
(52) U.S. Cl. .......... 380/255; 380/201; 713/153; 726/31; 726/32; 726/33
(58) Field of Classification Search .................... 380/255
See application file for complete search history.

(56) References Cited

U.S. PATENT DOCUMENTS

| | | | | |
|---|---|---|---|---|
| 5,764,863 | A * | 6/1998 | Fall et al. | 358/1.13 |
| 6,131,162 | A * | 10/2000 | Yoshiura et al. | 713/176 |
| 6,904,452 | B2 * | 6/2005 | Sedky et al. | 709/203 |
| 6,961,140 | B2 * | 11/2005 | Moore et al. | 358/1.15 |
| 7,158,252 | B2 * | 1/2007 | Kunz | 358/1.15 |
| 7,181,017 | B1 * | 2/2007 | Nagel et al. | 380/282 |
| 2002/0016921 | A1 | 2/2002 | Olsen et al. | 713/200 |
| 2002/0042884 | A1 * | 4/2002 | Wu et al. | 713/201 |
| 2003/0194093 | A1 * | 10/2003 | Evans et al. | 380/282 |
| 2004/0010704 | A1 * | 1/2004 | Lewis | 713/200 |
| 2004/0117655 | A1 * | 6/2004 | Someshwar | 713/201 |
| 2007/0245014 | A1 * | 10/2007 | Hibino et al. | 709/223 |

FOREIGN PATENT DOCUMENTS

| | | |
|---|---|---|
| JP | 2002152830 | 5/2002 |
| JP | 2003308194 | 10/2003 |
| JP | 2003330686 | 11/2003 |
| JP | 2004029938 | 1/2004 |
| WO | WO0029928 | 5/2000 |

\* cited by examiner

*Primary Examiner* — Nabil M El Hady
*Assistant Examiner* — Dant B Shaifer Harriman
(74) *Attorney, Agent, or Firm* — Law Office of Gerald Maliszewski; Gerald Maliszewski

(57) ABSTRACT

A system and method are provided for imaging job authorization. The method comprises: an authorization server receiving a request from a first node print subsystem to communicate an imaging job; in response to analyzing imaging job information, sending an access inquiry to a second node; the authorization server receiving an authorization, including a one-time use public encryption key, from the second node; sending a confirmation, including the public key, to the first node print subsystem; the first node encrypting the imaging job using the public key; sending the encrypted imaging job to the second node from the first node; and, the second node decrypting the imaging job using a private key corresponding to the public key. The analyzed imaging job information used for access control may include user ID, job content, first node ID, first node communication address, imaging job access control, time/date, imaging job size, or imaging job options.

28 Claims, 9 Drawing Sheets

Fig. 4B

| | SOURCE FILTER | FILTER TYPE | TRANSPORT OR JOB | PUBLIC KEY | SIGNATURE |
|---|---|---|---|---|---|
| 1 | 172.29.24.16 | IP | TRANSPORT | PUBLIC KEY1 | -- |
| 2 | 172.29.35.6 | IP | JOB | PUBLIC KEY2 | -- |
| 3 | MYCOMPUTER | DNS | TRANSPORT | PUBLIC KEY3 | -- |
| 4 | USER1 | USER | JOB | PUBLIC KEY4 | 28567 |
| 5 | DOCUMENT1 | DOC | JOB | PUBLIC KEY5 | <XXXXX> |

IMAGING JOB AUTHORIZATION

BACKGROUND OF THE INVENTION

1. Field of the Invention

This invention generally relates to digital image processing and, more particularly, to a system and method for controlling access to an imaging device, while securing the imaging job information when it transmitted between imaging clients and imaging devices.

2. Description of the Related Art

FIG. 1A is a diagram depicting a secure imaging job transmission method (prior art). One conventional method of secured printing uses encryption to prevent unauthorized access to information contained within an imaging job, when the job is transmitted between an imaging client, network server, and an imaging device such as a multifunctional peripheral (MFP). Generally, a public/private key encryption scheme. One such schema involves the generation of a single public/private encryption key by the imaging device, using the RSA algorithm for example. Using this algorithm, information can be encrypted using a public key, but only decrypted using the private key component. Thus, users can encrypt data to a receiver using the receiver's public key, without knowledge of the receiver's private key.

In this method, the imaging device advertises its public key. Generally, the imaging client obtains the advertised public key either directly from the device itself, using a device management protocol such as SNMP for example, or from a key server. In the later case, the imaging device registers itself, using information that uniquely identifies the device, and its public key with a public key server. An imaging client obtains the public key with a query that identifies the imaging device. The key server then transmits the public key associated with the imaging device to the client.

Once the imaging client has received the public key, the imaging client encrypts the imaging job in a manner that is compatible with the imaging device, for example in a compatible format layout, and transmits the imaging job to the imaging device. The imaging device, upon receipt of the imaging job, decrypts the imaging job and performs requested tasks.

Conversely, the imaging device may need to transmit an imaging job, or the result of a job, to an imaging client in a secure manner. In this case, the imaging client generates a public/private encryption key and registers itself and its public key with the key server. The imaging device encrypts the imaging job, or job result in a manner compatible with the imaging client, using the imaging client's public key.

While this method secures the transmission of the imaging job to the imaging device, it does not provide for any access control. That is, anybody, at anytime, can send any imaging job to/from the imaging device.

FIG. 1B is a drawing of a method that combines access control with secure imaging job transmissions (prior art). In this method, encryption is combined with the use of an access server and IP filtering. The imaging device supports IP filtering, restricting access to the imaging device to a specified list of network addresses, for example IP addresses. In one implementation, the imaging device is configured to only accept imaging jobs from a single imaging server. The imaging server then implements both the access control and the despooling of imaging jobs to/from the imaging device. Generally, the following sequence of events occurs:

1. An imaging client makes a request to the imaging server to despool the imaging job to/from imaging device.

2. The imaging server determines whether the request is authorized. If not, the process stops here.

3. The imaging server authorizes the despooling of the imaging job and sends the imaging device public key to the client.

4. The imaging client encrypts the imaging job using the public key and despools the imaging job to the imaging server.

5. The imaging server, either immediately or subsequently, despools the imaging job to the imaging device.

6. Upon receipt of a request to despool an imaging job, the imaging device verifies the network address of the sender against the network filter. This is an example of IP address filtering. If access from the network address is not authorized, the request is denied.

7. Otherwise, the imaging device grants the connection and allows the imaging job to be despooled to the imaging device.

8. The imaging device then decrypts the imaging job using the private key and performs the requested actions.

Conversely, the imaging device can send an imaging job, or job result, to the imaging client via the access/imaging server.

While this method is an improvement over the method of FIG. 1A, it still suffers in that:

1. The IP filter mechanism does not stop unauthorized access to the imaging device via some other print subsystem on the imaging server. For example, an administrator who has access to the print server can originate an imaging job on the imaging server without going through the access control component. The imaging device accepts the imaging job since the origination network address is valid.

2. The authorization method and public key encryption does not guarantee that the authorized job is the actual job sent to the imaging device. For example, the imaging server, after authorizing an imaging job and passing the public key, can replace the authorized imaging job with another imaging job. The alternate imaging job is encrypted with the public key and an imaging job is despooled that might otherwise not be authorized.

3. This method does not allow a more diverse imaging environment, such as a peer-peer despooling, ad-hoc origination from remote locations directly to the device or wirelessly (for example radio frequency (RF) or infrared), or direct despooling.

4. By funneling all imaging jobs through the imaging server, each imaging job is twice despooled over the network, increasing network traffic. The imaging server may become a bottleneck, depending on its bandwidth and processing capabilities.

It would be advantageous if access control and secured communications could be obtained in a network using an authorization server, without the necessity of relaying encrypted communications through the server.

SUMMARY OF THE INVENTION

The present invention improves upon the above-mentioned methods for authorizing and securing the contents of an imaging job through a variety of means. Using dynamic IP filtering, access to the imaging device by a network address is configured once per job by the authorization server. The authorization server has authority to set the IP access control on the imaging device. The imaging device only allows one imaging job to be used with an IP address access. Afterwards, the IP address access is purged. To initiate another job, the IP address must be reloaded into the imaging device.

Using dynamic public/private key generation, a sequence of unique public/private encryption keys are generated, one pair per job. The public/private encryption key is associated with the one-time use of the IP access filter. Once an imaging job originating from the authorized IP address is received, the public/private key pair and IP address access are purged. The authorization server only passes the public key, for example grants access to the backend of the despooling subsystem, such as a print spooler, print processor, or port monitor (manager).

The present invention prevents the user from exchanging authorized imaging job with another imaging job. The invention verifies the passing of a public key to the secured despooling process, by a digital signature for example. A diverse print environment is supported, such as peer-peer and adhoc, and network traffic and bottlenecks are reduced.

Accordingly, a method is provided for imaging job authorization. The method comprises: an authorization server receiving a request from a first node print subsystem to communicate an imaging job; in response to analyzing imaging job information, the authorization server sending an access inquiry to a second node; the authorization server receiving an authorization, including a one-time use public encryption key, from the second node; sending a confirmation, including the public key, to the first node print subsystem; the first node encrypting the imaging job using the public key; sending the encrypted imaging job to the second node from the first node; and, the second node decrypting the imaging job using a private key corresponding to the public key.

The first node print subsystem can be either a client source or a printer source. The second node can either be a client destination or a printer destination. The analyzed imaging job information that is used for access control may include user ID, job content, first node ID, first node communication address, imaging job access control, time/date, imaging job size, digital signature, biometric data, or imaging job options. An imaging job can be a print job, scan job, fax job, or document/image management job.

The method comprises the second node creating a linkage between a job identifier and the private key. Decrypting the imaging job using a private key corresponding to the public key includes: receiving the encrypted imaging job with the job identifier; and, cross-referencing the job identifier with the private key in a second node record. Then, the method comprises purging the private key and job identifier from the record, following the decryption of the imaging job. The job identifier can be a network (IP) address, a network (DNS) name, a network user name, a document name, a digital signature, biometric data, or a checksum.

Additional details of the above-described method and an imaging job authorization system are provided below.

BRIEF DESCRIPTION OF THE DRAWINGS

FIG. 4B is a drawing showing exemplary authorization record entries.

DETAILED DESCRIPTION OF THE PREFERRED EMBODIMENTS

Figure 2:
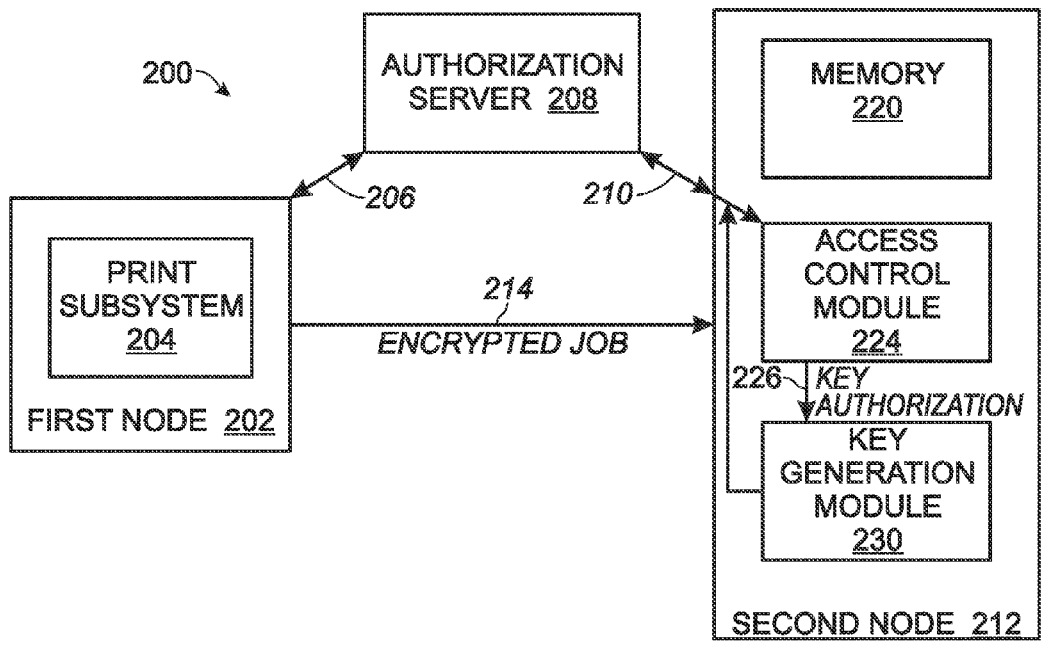
FIG. 2 is a schematic block diagram of the present invention imaging job authorization system.

FIG. 2 is a schematic block diagram of the present invention imaging job authorization system. The system 200 comprises a first node device 202 including a print subsystem 204 having an interface on line 206 for sending a request to communicate an imaging job. The print subsystem 204 may include the elements of a print driver, print spooler (despooler), print processor, or a port manager (monitor). An imaging job type may be a print job, scan job, fax job, or a document/image management job. Modern MFPs now include the functionality of a document/image server. As such, the MFP supports the operations of archiving or retrieving, either documents or images, to or from the MFP. The MFP can convert a document/image format to another, send/receive documents/images via email, or host/publish web pages to name a few examples. As used herein, a document/image management job is defined as an MFP performing one of the above-mentioned document/image server functions.

An authorization server 208 has an interface on line 206 for receiving the request from the first node print subsystem 204. The authorization server 208 has an interface on line 210 to send an access inquiry in response to analyzing imaging job information.

A second node device 212 has an interface on line 210 for receiving the access inquiry from the authorization server and for sending an authorization to the authorization server 208. The authorization includes a one-time use public encryption key. In response to receiving the authorization, the authorization server 208 sends a confirmation, including the public key, to the first node device print subsystem 204. The first node device print subsystem 204 encrypts the imaging job using the public key and sends the encrypted imaging job to the second node on line 214. That is, the encrypted imaging job bypasses (is not relayed by) the authorization server 208. The second node device 212 decrypts the imaging job using a private key corresponding to the public key. It should be understood that although lines 206, 210, and 214 are shown as separate, they may all be supported by the same physical resources, such as a local area network (LAN) or an IP network for example.

The first node device print subsystem 204 is embedded in a device such as a client source or a printer source. For example, the client source may be a personal computer (PC) or a handheld device such as a personal digital assistance (PDA) or a cell phone to name a few examples. The printer source can be an MFP, copier, printer, fax, or scanner to name a few examples. Likewise, the second node device 212 may be a client destination or a printer destination, as described above. For example, a first node PC may be sending a print job to a second node MFP for printing. Alternately, a first node scanner may seek to send a scanned image to a second node PC for storage. Typically, if the first node device 202 is a client, then the second node device 212 is a printer, and if the first node device 202 is a printer, then the second node device 212 is a client.

To limit unfettered use of the second node device 212, the authorization server 208 authorizes access to the second node device 212 in response to analysis of imaging job information. The following types of imaging job information may be examined: user ID, first node ID, document name, or first node communication address. Alternately, the authorization server 208 may analyze the job content. For example, a certain class of files, such as TIFF files, or a document with particular keywords may be excluded. Further types of imaging job access controls are possible. The time/date may be used for access control. For example, no print jobs may be submitted between the hours of 8 AM and 5 PM. Alternately, the size of the imaging job may be used as a control. In addition, a digital signature or biometric data may be used for access control. In another aspect, imaging job options are analyzed. For example, no jobs requiring the use of a stapler or a hole-punch are allowed access to the second node device 212.

The second node device 212 creates a linkage between a job identifier and the private key. The second node device 212 decrypts a received imaging job in response to receiving the job identifier and cross-referencing the job identifier with the private key. More specifically, the second node device 212 includes a memory 220 for storing the job identifier and corresponding private key. The second node device 212 purges the private key and job identifier from the memory 220 following the decryption of the imaging job.

Typically, the second node device generates a job identifier and sends the job identifier, with the public key, in the authorization that is returned to the authorization server 208. Alternately, the authorization server may select the job identifier. The job identifier can be a network (IP) address, a network (DNS) name, a network user name, a document name, a digital signature, biometric data, or a checksum. Note, the above-mentioned job identifiers are associated with different levels of security. For example, if the job identifier just includes the first node device IP address, then it may be possible for the first node device 202 to submit one job for authorization, but to actually encrypt and send an alternate job. If a checksum is included, then it is more difficult to substitute jobs, at the cost of more process-intensive security. Note, more than one job identifier may be used, for example, an IP address and the document size may be used as the job identifier.

In one aspect, the first node print subsystem uses different imaging job encryption processes. In addition to encrypting the entire job, it is possible to encrypt just the imaging job control commands, just the imaging job data, and/or a portion of the imaging job. In this manner, processing resources can be traded against security.

In another aspect, the second node device 212 further includes an access control module 224. The access control module 224 has an interface on line 210 for receiving imaging job information from the authorization server 208 with the access inquiry. The access control module 224 has an interface on line 226 to supply key authorization in response to analyzing the imaging job information. That is, a second layer of access control is provided at the second node device 212, in addition to the first level of access control provided by the authorization server 208.

In a different aspect, the second node device 212 further includes a key generation module 230 for generating a one-time use public/private key pair. The key generation module 230 has an interface connected to the authorization server on line 210 to supply the public key with the authorization. In a variation, the key generation module 230 generates a plurality of one-time use public/private key pairs that are supplied to the authorization server 208 with the authorization. The plurality of keys is relayed to the first node device 202 with the confirmation. The first node print subsystem 204 encrypts the imaging job using the plurality of public keys. For example, the first node device print subsystem 204 may encrypt a plurality of imaging job portions using the plurality of public keys.

Functional Description

The present invention method of authorizing and encrypting/decrypting an imaging job described herein is independent of the means used to initiate the imaging job, the public/private key algorithm for encryption, the method used to encrypt/decrypt the imaging job using the public/private keys, and the method used to generate the public/private keys. For example, an imaging job may be generated by a printer driver from an application. The application converts the document into printing instructions, such as GDI (Graphics Device Interface) in the MS family of operating systems. The printing instructions are passed to a printer driver installed on the client and/or server associated with the printing device. The printer driver converts the printing instructions into a printer dependent format, such as a raster image or page description language (PDL). In other cases, such as Direct Printing, the document format can be directly interpreted by the printer and there is no preprocessing of the document format into a printer dependent format.

For example, an imaging job may be encrypted using an industry/government standard such as RSA Triple-DES encryption or Advanced Encryption System (AES). The entire imaging job may be encrypted, or some subset thereof.

The invention is independent of the method used to determine imaging job authorization. For example, the authorization method may be based on the access control to a specific document/image. The invention is independent of the imaging job type. For example, the imaging job may be a print, scan, fax, or document management job.

As used herein, devices that receive or transmit an imaging job, such as an MFP or computing device, are imaging devices. Computing devices that construct and despool an imaging job to, or receive from, either an imaging device or server, are referred to herein as client computing devices, or clients. Computing devices that manage an imaging device, receive imaging jobs, and respool the imaging job to/from an imaging device, are referred to as server computing devices, or authorization servers.

Imaging Job Control Overview

Figure 1A:
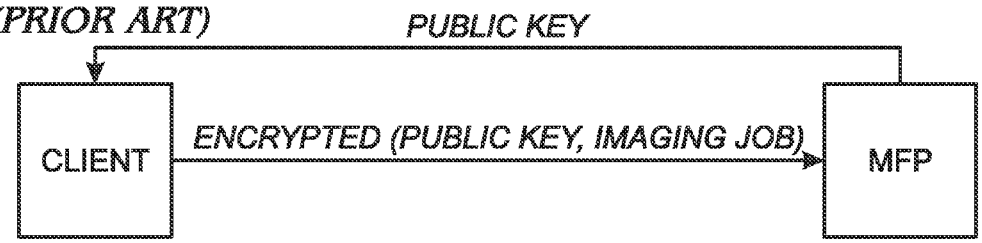
FIG. 1A is a diagram depicting a secure imaging job transmission method (prior art).
Figure 1B:
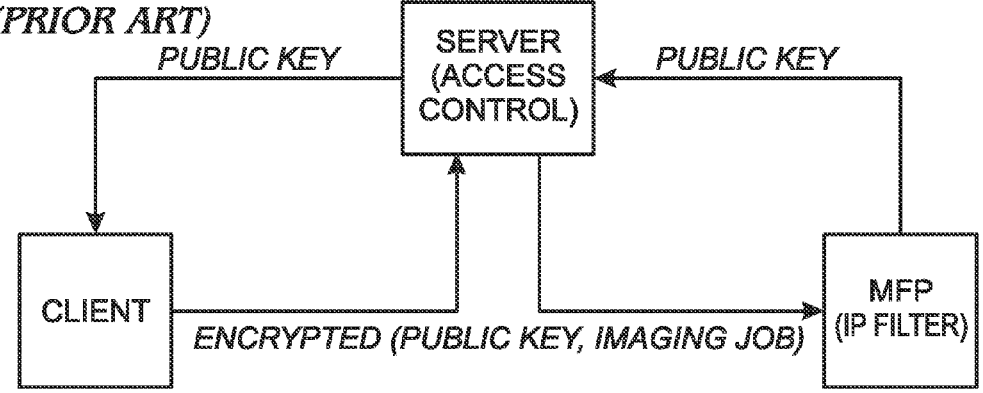
FIG. 1B is a drawing of a method that combines access control with secure imaging job transmissions (prior art).
Figure 3A:
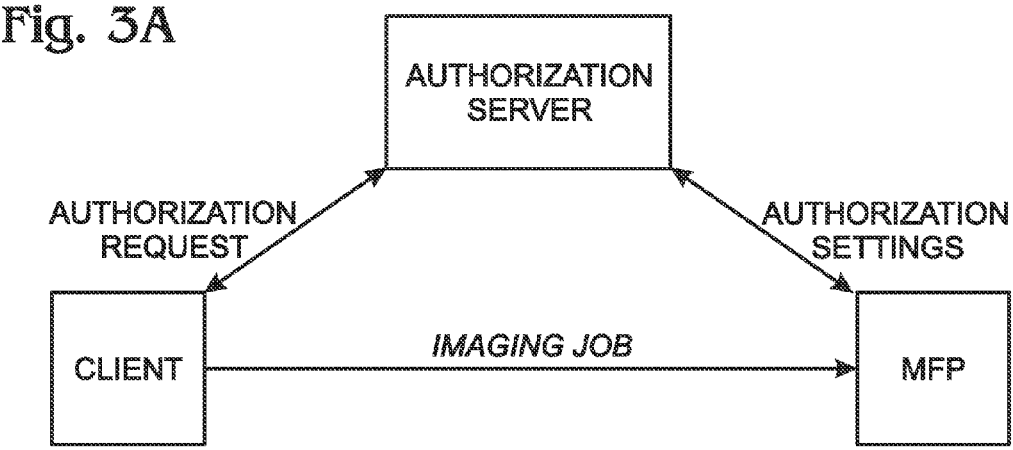
FIG. 3A is a diagram depicting a first aspect of the present invention authorization system.

FIG. 3A is a diagram depicting a first aspect of the present invention authorization system. An imaging job is either despooled from an imaging client to an imaging device, or vice-versa. In the former case (FIG. 3A), the imaging job is initiated on the imaging client. Examples of imaging jobs include, but not limited to: a print job, scan job, fax job, or document management. The imaging job may be initiated manually by a user, or by some automatic or other background process. The imaging job may be preprocessed into a imaging device ready format, such as by a printer driver, or already be in a device ready format, such as in direct printing.

Once the imaging job is initiated, the imaging job is spooled to the imaging client's imaging spooler. Prior to despooling the imaging job, the imaging spooler contacts the authorization server to be granted access for the imaging job to the imaging device. Examples of an imaging spooler include, but are not limited to, a print spooler, a print/fax spooler, a scan spooler, or an integrated imaging spooler.

Alternately, the process of requesting authorization for despooling an imaging job occurs later in the despooling process, using either an imaging processor or port monitor. An example of an imaging processor is the print processor component in the Microsoft® Windows® family of operating systems. An example of a port monitor is the port monitor component in the Microsoft® Windows® family of operating systems.

The imaging spooler, or other despooling component, verifies itself when contacting the authorization server. For example, the verification may be a digital signature, but other means are possible. Upon verification, the despooling component passes information concerning the imaging job to the authorization server. The authorization server examines the imaging job information and determines whether to grant authorization. For example, the authorization may be based on or any combination of factors including, but not limited to:
  1. The origination source, for example the client computing device.
  2. The originating user, for example the user name.
  3. Access control on the document/image.
  4. Date/time of day.
  5. Size of imaging job.
  6. Options specified for imaging job.
  7. Document content.

If the authorization server does not grant access, an authorization denial response is sent back to the imaging spooler or other despooling component, and the imaging job is terminated. Otherwise, the authorization server contacts the imaging device, using a management protocol such as SNMP for example, and passes the network address (IP address) of the imaging client with a request to grant network address access. This is an example of access control through the use of IP address filtering. The communication address of the device may also be a local address, such as a parallel, serial, or USB port. Alternately, the device may be connected by some combination of communication addresses, where one communication address is used for the authorization requests and another for sending/receiving imaging jobs.

The imaging device, upon receipt of the network address access request, generates a unique public/private encryption key, stores the network address and private key, and passes the public key to the authorization server. The authorization server sends a confirmation and the public key to the imaging spooler or other despooling component on the imaging client. The imaging client then encrypts the imaging job using the public key in a manner that is compatible with the imaging device. Possible encryption methods include, but not limited to:
  1. The entire imaging job being encrypted.
  2. The imaging control commands not being encrypted, but imaging data being encrypted.
  3. Segmented encryption, whereby only commands, or operands thereof that reveal content information are encrypted.

The despooling component then despools the encrypted imaging job directly to the imaging device.

The imaging device, upon receipt of the imaging job, looks up the network address of the origination of the imaging job (the imaging client) in the stored network filter access. If the network address is not found, despooling to the imaging device is not granted. Otherwise, the imaging device accepts despooling of the imaging job and decrypts the imaging job using the private key stored with the network address. Upon completion of the imaging job, the network address access and private key stored in the imaging device is purged.

Figure 3B:
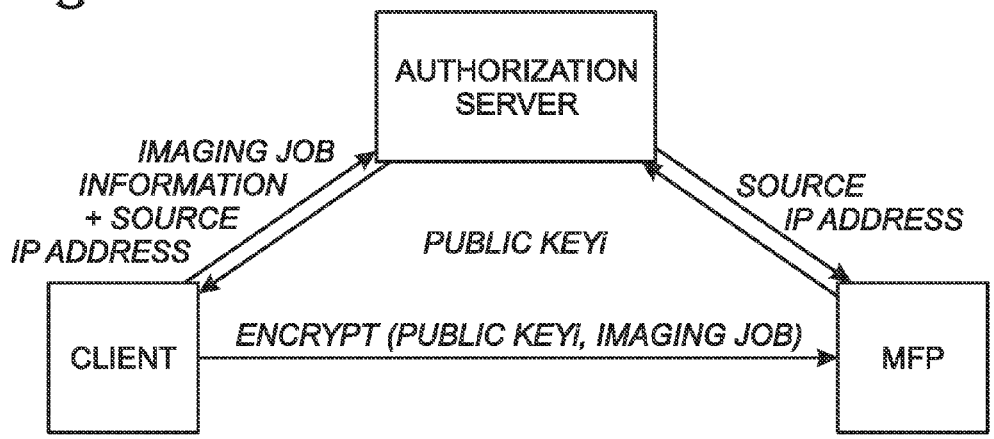
FIG. 3B is a diagram showing a second aspect of the present invention authorization system.

FIG. 3B is a diagram showing a second aspect of the present invention authorization system. Conversely (as compared to FIG. 3A), the imaging job can originate on the imaging device, such as in a network scan job. In this case, the imaging device may access the imaging server on behalf of the user to confirm authorization. If authorized, the authorization server contacts the imaging spooler at the destination, and passes on the network address of the imaging device. The destination generates a unique public/private key pair, stores the network address of the imaging device and private key, and passes the public key to the authorization server. The authorization server relays the public key to the imaging device.

The imaging device encrypts the imaging job and despools the imaging job to the destination. Upon receipt of the imaging job, the destination looks up the network address origin of the imaging job (the imaging device) in the stored network filter access. If the network address is not found, despooling to the destination is not granted. Otherwise, the imaging spooler accepts despooling of the imaging job and decrypts the imaging job using the private key stored with the network address. Upon completion of the imaging job, the network address access and private key stored in the destination is purged.

Figure 3C:
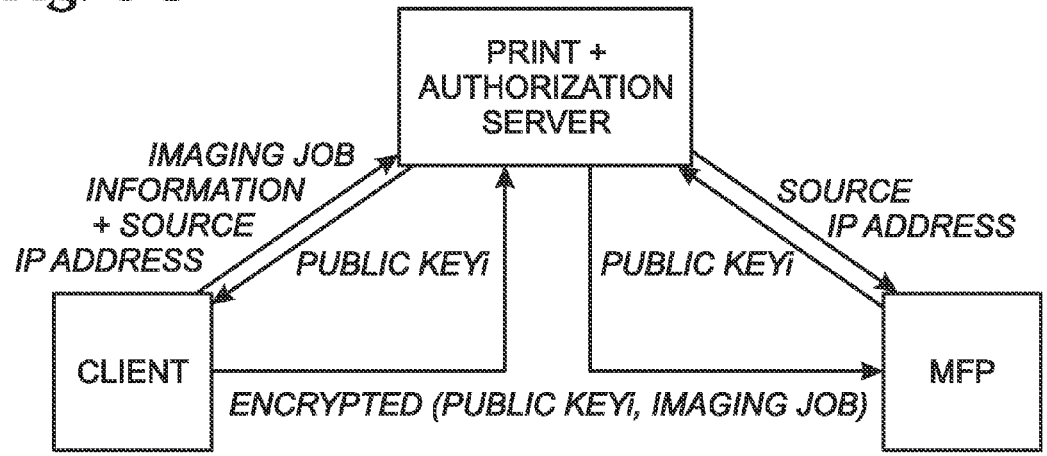
FIG. 3C is a diagram depicting a third aspect of the present invention authorization system.

FIG. 3C is a diagram depicting a third aspect of the present invention authorization system. Alternately, the authorization server may also be an imaging server. In this case, the imaging job is first despooled to the imaging server, before being despooled to the imaging device or client. Information regarding the originating source is then either communicated directly to the imaging device or client, or embedded in the imaging job.

MFP Internals—Authorization Settings

Figure 4A:
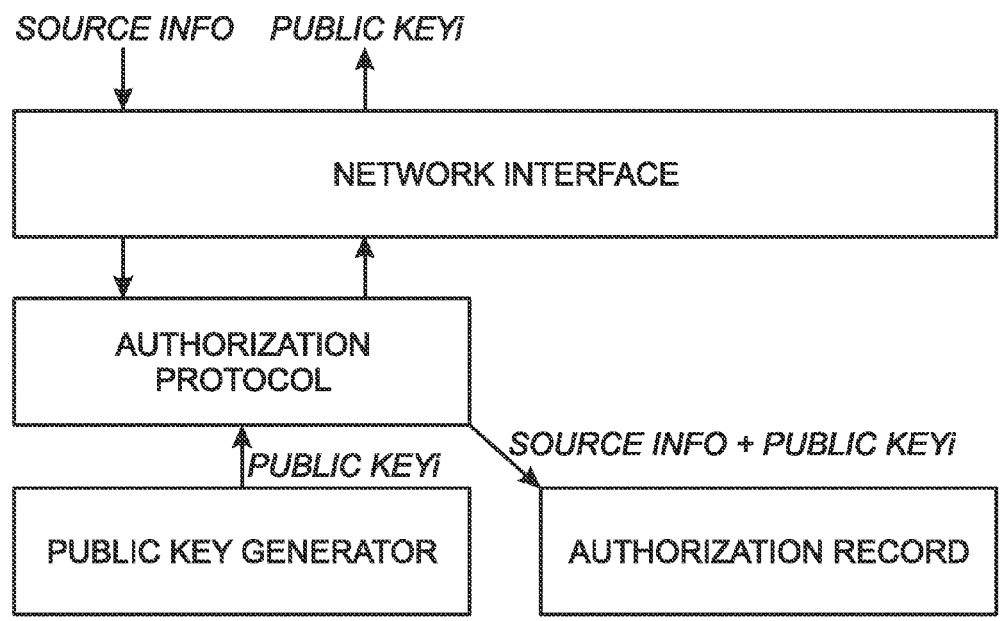
FIG. 4A is a drawing depicting specifics of the second node imaging device.

FIG. 4A is a drawing depicting specifics of the second node imaging device. In one aspect, the imaging device has a network interface, authorization protocol, public/private key generator, and a means for recording the network address access and associated private key. The authorization server communicates with the imaging device through the network interface using the authorization protocol. The authorization protocol allows the imaging server to request a network address access for a specified network address. The authorization protocol component in the imaging device then obtains, from the public/private key generator, a unique public/private encryption key.

The authorization component stores the network address and associated private key in an authorization record. Finally, the imaging device responds back to the imaging server with an authorization and the generated public key.

FIG. 4B is a drawing showing exemplary authorization record entries. In this example, each record contains the source identifier (for example, the network address) for access and the type of source identifier. Source identifiers can include, but are not limited to:
  1. Network Address, for example IP Address.
  2. Network Name, for example DNS Name.
  3. Network User Name
  4. Document Name Each record contains information regarding the determination of source origination, such as at the transport layer (for example, network address), or at the data layer, such as embedded in the imaging job. Additionally, each record contains the associated private key and optionally a secondary verification method, such as a digital signature or checksum.

Authorization Server

Figure 5A:
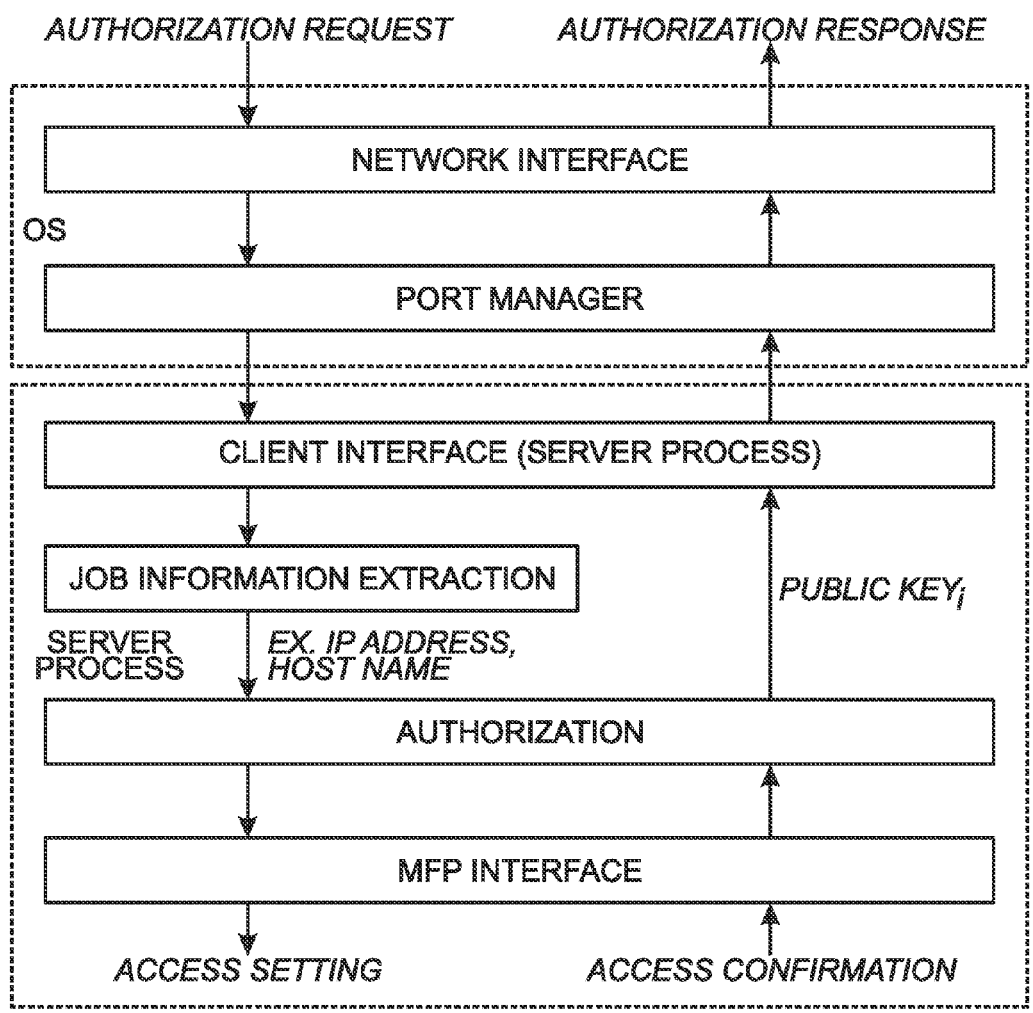
FIG. 5A is a diagram depicting a peer-to-peer authorization system.

FIG. 5A is a diagram depicting a peer-to-peer authorization system. In one aspect, the authorization server has a client interface, a job information extraction method, an authorization method, and an imaging device interface. The imaging client makes a request for despooling an imaging job to the authorization server via the client interface. The despooling request includes imaging job information that identifies the imaging client. In one case, information identifying the client is obtained at the transport layer (for example, network address), in another case the information is embedded in the request data (for example, host name), and in another case the information is derived from either information obtained in the transport layer or request data (for example, host name lookup in DNS server).

The imaging job information includes at least the information required for the network filter access record in the imaging device, and any additional information required for the authorization request. This information may include, but is not limited to:

1. User Name
2. Document Name
3. Imaging Job Control Options
4. Access control on the document/image.
5. Date/time of day.
6. Size of imaging job.
7. Document content.

A job information extraction module extracts, from the request data, the information pertinent to the authorization process and the network filter access record in the imaging device, and passes the information to the corresponding modules.

The authorization module determines if the imaging job is authorized. Any authorization algorithm may be used. For example, authorization algorithms include, but are not limited to:

1. User's access rights to the imaging device.
2. Time imaging job is scheduled.
3. User's access rights to the document/image.
4. Imaging job's special features, such as stapling.
5. User's access rights to content in the document.
6. Filtering of copyright or other prohibited content.

If the imaging job is authorized, the authorization module makes an access setting request, containing the information pertinent to the network filter access record. The request is send to the imaging device via the imaging device interface.

The authorization module then waits for an access authorization response from the imaging device. If the access is granted, the authorization module then sends a confirmation response, containing the public key extracted from the access authorization, to the imaging client via the client interface.

Figure 5B:
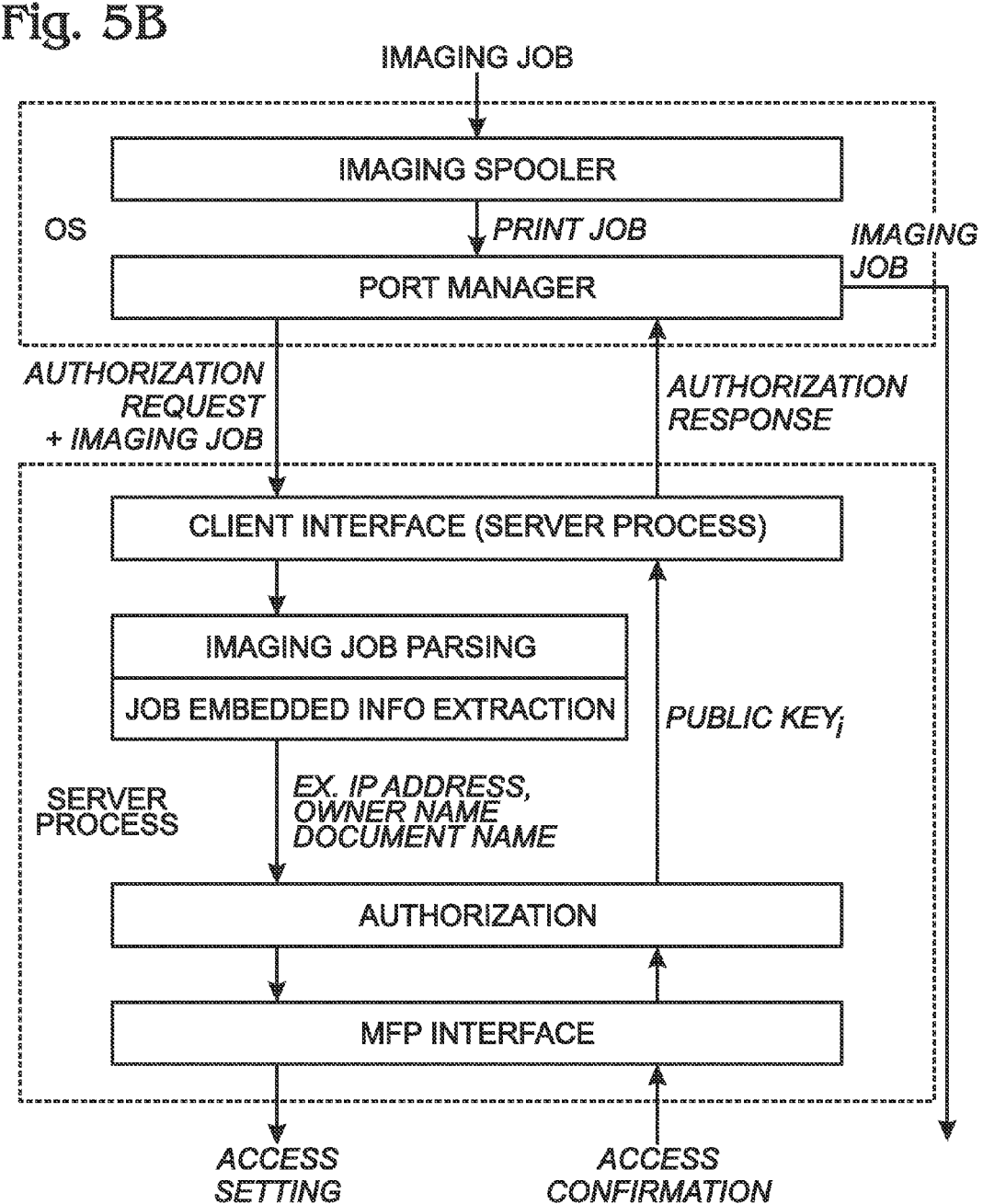
FIG. 5B is a diagram depicting an imaging server authorization system.

FIG. 5B is a diagram depicting an imaging server authorization system. In an alternate aspect, the authorization server also acts as an imaging server for the imaging device. The imaging client despools the imaging job to the authorization/imaging server without making an authorization request. The imaging spooler, or other imaging despooling subcomponent, makes the authorization request on behalf of the imaging client via the client interface.

This process differs from above-mentioned aspects in that:

1. The job information is extracted from the imaging job and/or job scheduling information from the imaging spooler. For example, the user and document name are obtained from the job scheduling information. Further, imaging options can be obtained from the image job control commands in the imaging job.
2. The source origination information is extracted from the imaging job and/or job scheduling information from the imaging spooler. For example, the host information on the imaging client can be obtained from the job scheduling information, or may otherwise be embedded in the image job.

Image Job Despooling

Figure 6:
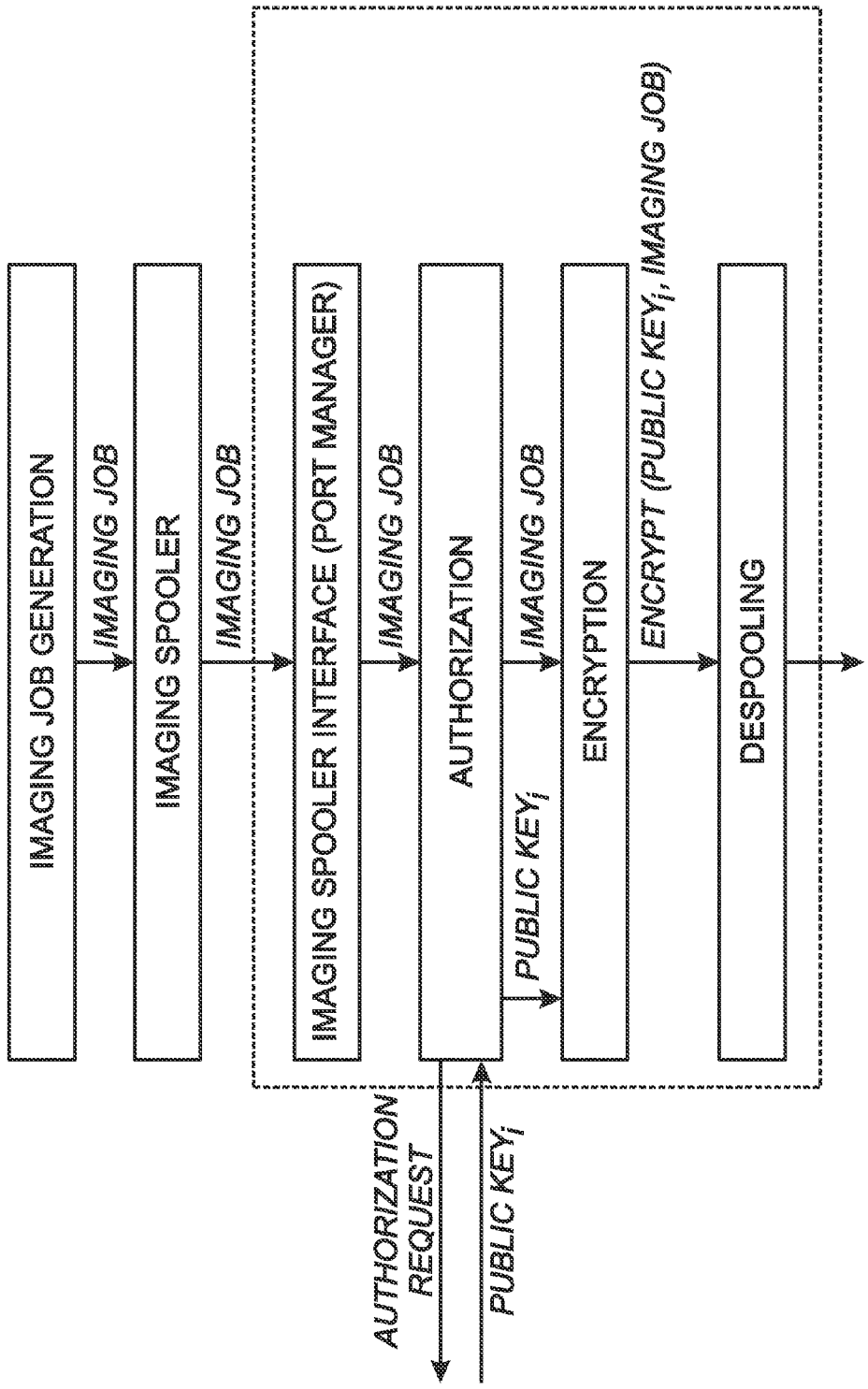
FIG. 6 is a drawing specifically depicting the despooling of the encrypted imaging job by the first node print subsystem.

FIG. 6 is a drawing specifically depicting the despooling of the encrypted imaging job by the first node print subsystem. After the imaging client has received the authorization confirmation with the public encryption key, the despooling component (for example, the imaging spooler, imaging processor, or port manager) initiating the authorization request, performs the following actions:

1. Encrypting the imaging job using the public encryption key in a manner that is compatible with the imaging device.
2. Initiating the despooling of the encrypted imaging job by making a connection via the port manager to the imaging device or imaging spooler.
3. Waiting for acceptance of the connection.
4. Despooling the encrypted imaging job through the port manager associated with the imaging device or imaging server.

Image Job Execution

Figure 7:
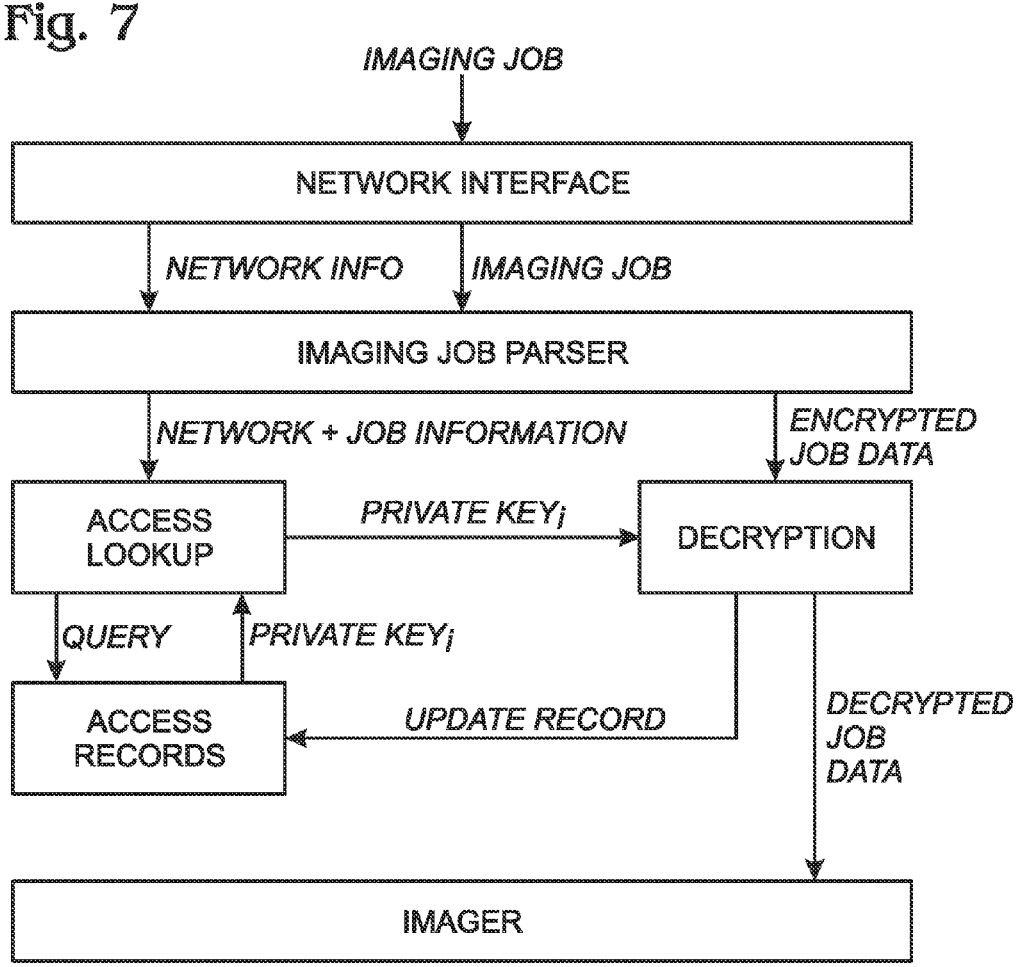
FIG. 7 is a diagram specifically depicting the execution of the imaging job.

FIG. 7 is a diagram specifically depicting the execution of the imaging job. After receiving a request to despool an imaging job to the imaging device, the imaging device:

1. Extracts the imaging job origination information, either from the transport layer or embedded in the imaging job.
2. Looks in the network filter access records for an access entry for the origination.
3. If no entry exists, the process terminates and the despooling request is denied.
4. Retrieves the private encryption key associated with origination.
5. The imaging device acknowledges acceptance of despooling of the imaging job to the imaging device.
6. The imaging device decrypts the imaging job using the private encryption key.
7. The imaging device passes the decrypted imaging job to the imager.
8. The network access filter record associated with the imaging job is purged.

Note, in the case where the origination information is obtained from within the imaging job, some or all of the imaging job must first be despooled to the imaging device, or storage accessible by the imaging device, prior to the lookup of the access record.

Figure 8:
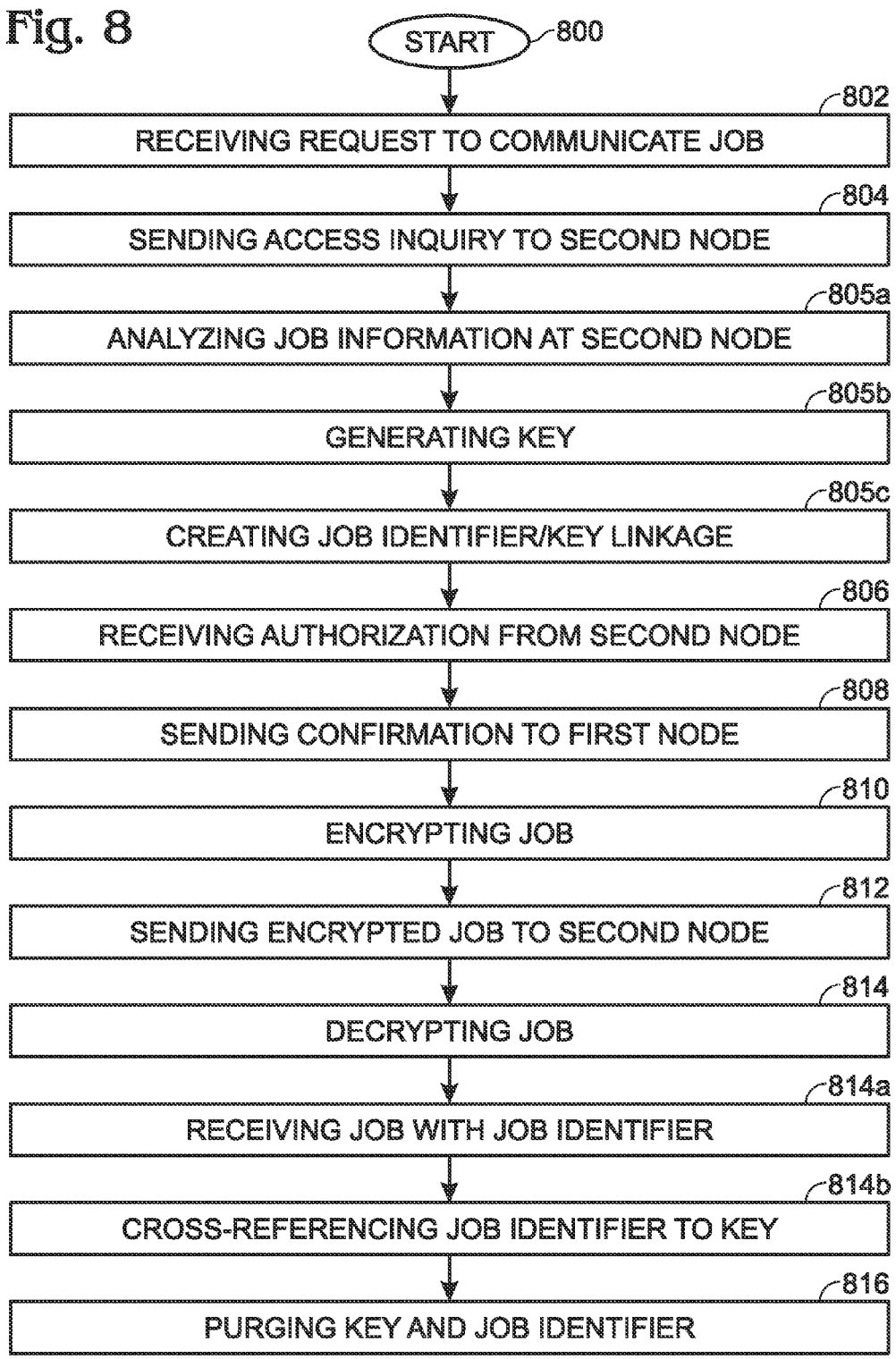
FIG. 8 is a flowchart illustrating the present invention method for imaging job authorization.

FIG. 8 is a flowchart illustrating the present invention method for imaging job authorization. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802, at an authorization server, receives a request from a first node print subsystem to communicate an imaging job, where the imaging job can be, for example, a print job, scan job, fax job, or a document/image management job, as defined above. Step 804 sends an access inquiry to a second node in response to analyzing imaging job information. Step 806, at the authorization server, receives an authorization, including a one-time use public encryption key, from the second node. Step 808 sends a confirmation, including the public key, to the first node print subsystem. Step 810, at the first node, encrypts the imaging job using the public key. Step 812 sends the encrypted imaging job to the second node from the first node. Step 814, at the second node, decrypts the imaging job using a private key corresponding to the public key. Step 816 purges the public/private key pair.

Receiving a request from a first node print subsystem to communicate an imaging job (Step 802) includes receiving a request from a first node that is either a client source or a printer source, where a print system may include an element such as a print driver, print spooler, print processor, or port manager (monitor). Sending the encrypted imaging job to the second node (Step 812) includes sending the encrypted imaging job to a second node that can either be a client destination or a printer destination.

In one aspect, sending an access inquiry to a second node in response to analyzing imaging job information (Step 804) includes authorizing access to the second node in response to analysis of imaging job information such as user ID, job content, document name, first node ID, first node communication address, imaging job access control, time/date, imaging job size, digital signature, biometric data, or imaging job options.

In one aspect, sending an access inquiry to a second node (Step 804) includes sending imaging job information to the second node. Then, a further step, Step 805*a*, at the second node, analyzes the imaging job information. Receiving an authorization in Step 806 includes receiving the public key in response to the second node imaging job information analysis.

In another aspect Step 805*b*, prior to sending the one-time use public key to the authorization server, generates the one-time use public key and corresponding private key at the second node. In a different aspect, Step 805*c*, at the second node, creates a linkage between a job identifier and the private key. For example, the job identifier may be a network (IP) address, a network (DNS) name, a network user name, a document name, a digital signature, biometric data, or a checksum. Then, decrypting the imaging job using a private key corresponding to the public key in Step 814 includes substeps. Step 814*a* receives the encrypted imaging job with the job identifier. Step 814*b* cross-references the job identifier with the private key.

More specifically, creating a linkage between a job identifier and the private key in Step 805*c* includes storing the job identifier and corresponding private key in a second node record. Then Step 816, following the decryption of the imaging job, purges the private key and job identifier from the record.

In one aspect, encrypting the imaging job using the public key in Step 810 includes using a process such as encrypting the entire job, encrypting just the imaging job control commands, encrypting a portion of the imaging job, or encrypting just the imaging job data.

In a different aspect, receiving an authorization at the authorization server in Step 806 includes receiving a plurality of one-time public encryption keys. Then, encrypting the imaging job using the public key at the first node in Step 810 includes encrypting the imaging job using the plurality of public keys. For example, Step 810 may encrypt a plurality of imaging job portions using the plurality of public keys.

A system and method have been provided for imaging job authorization based upon the use of an authorization server. Examples have been given of uses for the invention, as well as particular communication mechanisms. However, these examples have been given to clarify, and the invention should not be limited to merely these examples. Although the invention has generally been explained in the context of a Microsoft Windows® operating system, the invention can also be practiced with subsystems of an Apple MacIntosh Operating System, Linux Operating System, System V Unix Operating Systems, BSD Unix Operating Systems, OSF Unix Operating Systems, Sun Solaris Operating Systems, HP/UX Operating Systems, or IBM Mainframe MVS and AS/400 Operating System, to name a limited list of other possibilities. Other variations and embodiments of the invention will occur to those skilled in the art.

I claim:

1. A method for imaging job authorization, the method comprising:
   at an authorization server, receiving a request from a first node print subsystem to communicate an imaging job;
   in response to analyzing imaging job information, sending an access inquiry to a second node;
   at the authorization server, receiving an authorization, including a one-time use public encryption key, from the second node;
   sending a confirmation, including the public key, to the first node print subsystem;
   at the first node, encrypting the imaging job using the public key; and,
   sending the encrypted imaging job to the second node from the first node.

2. The method of claim 1 further comprising:
   at the second node, decrypting the imaging job using a private key corresponding to the public key.

3. The method of claim 2 wherein receiving a request from a first node print subsystem to communicate an imaging job includes receiving a request from a first node selected from the group including a client source and a printer source.

4. The method of claim 3 wherein sending the encrypted imaging job to the second node includes sending the encrypted imaging job to a second node selected from the group including a client destination and a printer destination.

5. The method of claim 2 wherein sending an access inquiry to a second node in response to analyzing imaging job information includes authorizing access to the second node in response to analysis of imaging job information selected from the group including document name, user ID, job content, first node ID, first node communication address, imaging job access control, time/date, imaging job size, digital signature, biometric data, and imaging job options.

6. The method of claim 1 wherein receiving a request from a first node print subsystem to communicate an imaging job includes receiving a request to communicate an imaging job type selected from the group including a print job, scan job, fax job, and document/image management job.

7. The method of claim 2 further comprising:
   at the second node, creating a linkage between a job identifier and the private key; and,
   wherein decrypting the imaging job using a private key corresponding to the public key includes:
      receiving the encrypted imaging job with the job identifier; and,
      cross-referencing the job identifier with the private key.

8. The method of claim 7 wherein creating a linkage between a job identifier and the private key includes storing the job identifier and corresponding private key in a second node record; and,
   the method further comprising:
      following the decryption of the imaging job, purging the private key and job identifier from the record.

9. The method of claim 7 wherein creating a linkage between a job identifier and the private key includes using a job identifier selected from the group including a network (IP) address, a network (DNS) name, a network user name, a document name, a digital signature, biometric data, and a checksum.

10. The method of claim 2 wherein encrypting the imaging job using the public key includes using a process selected from the group including encrypting the entire job, encrypting just the imaging job control commands, encrypting just the imaging job data, and encrypting a portion of the imaging job.

11. The method of claim 2 further comprising:
prior to sending the one-time use public key to the authorization server, generating the one-time use public key and corresponding private key at the second node.

12. The method of claim 2 wherein sending an access inquiry to a second node includes sending imaging job information to the second node;
the method further comprising:
at the second node, analyzing the imaging job information; and,
wherein receiving an authorization, including a one-time use public encryption key, at the authorization server, includes receiving the public key in response to the second node imaging job information analysis.

13. The method of claim 1 wherein receiving an authorization at the authorization server, including a one-time use public encryption key, includes receiving a plurality of one-time public encryption keys; and,
wherein encrypting the imaging job using the public key at the first node includes encrypting the imaging job using the plurality of public keys.

14. The method of claim 13 wherein encrypting the imaging job using the plurality of public keys includes encrypting a plurality of imaging job portions using the plurality of public keys.

15. An imaging job authorization system, the system comprising:
a first node device including a print subsystem having an interface for sending a request to communicate an imaging job;
an authorization server having an interface for receiving the request from the first node print subsystem and an interface to send an access inquiry in response to analyzing imaging job information;
a second node device having a interface for receiving the access inquiry from the authorization server and for sending an authorization to the authorization server, including a one-time use public encryption key;
wherein the authorization server sends a confirmation, including the public key, to the first node device print subsystem; and,
wherein the first node device print subsystem encrypts the imaging job using the public key and sends the encrypted imaging job to the second node.

16. The system of claim 15 wherein the second node device decrypts the imaging job using a private key corresponding to the public key.

17. The system of claim 16 wherein the first node device print subsystem is embedded in a device selected from the group including a client source and a printer source.

18. The system of claim 17 wherein the second node device is a device selected from the group including a client destination and a printer destination.

19. The system of claim 16 wherein the authorization server authorizes access to the second node device in response to analysis of imaging job information selected from the group including document name, user ID, job content, first node ID, first node communication address, imaging job access control, time/date, imaging job size, digital signature, biometric data, and imaging job options.

20. The system of claim 15 wherein the first node device sends a request to communicate an imaging job type selected from the group including a print job, scan job, fax job, and document/image management job.

21. The system of claim 16 wherein the second node device creates a linkage between a job identifier and the private key, and decrypts a received imaging job in response to receiving the job identifier and cross-referencing the job identifier with the private key.

22. The system of claim 21 wherein the second node device includes a memory for storing the job identifier and corresponding private key, the second node device purging the private key and job identifier from the memory following the decryption of the imaging job.

23. The system of claim 21 wherein the second node device generates a job identifier selected from the group including a network (IP) address, a network (DNS) name, a network user name, a document name, a digital signature, biometric data, and a checksum.

24. The system of claim 16 wherein the first node print subsystem encrypts the imaging job using a process selected from the group including encrypting the entire job, encrypting just the imaging job control commands, encrypting just the imaging job data, and encrypting a portion of the imaging job.

25. The system of claim 16 wherein the second node device further includes a key generation module for generating a one-time use public/private key pair, and an interface connected to the authorization server to supply the public key with the authorization.

26. The system of claim 16 wherein the second node device further includes an access control module, the access control module having an interface for receiving imaging job information from the authorization server with the access inquiry, and an interface to supply key authorization in response to analyzing the imaging job information.

27. The system of claim 16 wherein the second node device further includes a key generation module for generating a plurality of one-time use public/private key pairs, and an interface connected to the authorization server to supply the plurality of public keys with the authorization; and,
wherein the first node print subsystem encrypts the imaging job using the plurality of public keys.

28. The system of claim 27 wherein the first node device print subsystem encrypts a plurality of imaging job portions using the plurality of public keys.

* * * * *